US009976473B2

(12) United States Patent
Glugla et al.

(10) Patent No.: US 9,976,473 B2
(45) Date of Patent: *May 22, 2018

(54) CONDENSATION CONTROL IN A CHARGE AIR COOLER BY CONTROLLING CHARGE AIR COOLER TEMPERATURE

(71) Applicant: Ford Global Technologies, LLC, Dearborn, MI (US)

(72) Inventors: Chris Paul Glugla, Macomb, MI (US); Garlan J. Huberts, Milford, MI (US); Gopichandra Surnilla, West Bloomfield, MI (US); Daniel Joseph Styles, Canton, MI (US); David Karl Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/608,727

(22) Filed: May 30, 2017

(65) Prior Publication Data

US 2017/0260896 A1    Sep. 14, 2017

Related U.S. Application Data

(63) Continuation of application No. 13/664,248, filed on Oct. 30, 2012, now Pat. No. 9,664,104.

(51) Int. Cl.
*F02B 29/04* (2006.01)
*F01P 7/04* (2006.01)

(52) U.S. Cl.
CPC .......... *F02B 29/0493* (2013.01); *F01P 7/048* (2013.01); *F01P 2060/02* (2013.01); *F02B 29/04* (2013.01); *Y02T 10/146* (2013.01)

(58) Field of Classification Search
CPC ....... F02B 29/0493; F02B 29/04; F01P 29/04; F01P 2060/02; Y02T 10/146
See application file for complete search history.

(56) References Cited

U.S. PATENT DOCUMENTS

| | | |
|---|---|---|
| 4,930,460 A | 6/1990 | Aihara et al. |
| 5,542,399 A | 8/1996 | Altmann et al. |
| 6,314,950 B1 | 11/2001 | Burbank et al. |
| 6,390,214 B1 | 5/2002 | Takahashi et al. |
| 6,408,831 B1 | 6/2002 | Craig et al. |

(Continued)

FOREIGN PATENT DOCUMENTS

| | | |
|---|---|---|
| DE | 102007005393 A1 | 8/2008 |
| GB | 2055963 A | 3/1981 |

OTHER PUBLICATIONS

State Intellectual Property Office of the Peoples Republic of China, Office Action and Search Report Issued in Application No. 201310524495.3, dated Feb. 17, 2017, 8 pages. (Submitted with Partial Translation).

*Primary Examiner* — Anne M Antonucci
(74) *Attorney, Agent, or Firm* — Julia Voutyras; McCoy Russell LLP

(57) ABSTRACT

Methods and systems are provided for reducing corrosion of a charge air cooler and reducing engine misfire due to condensate formation. In response to charge air cooler outlet temperature, electric fan operation and grille shutter opening is adjusted. Electric fan operation and grille shutter opening may also be controlled in response to vehicle operating conditions.

20 Claims, 8 Drawing Sheets

(56) References Cited

U.S. PATENT DOCUMENTS

| | | |
|---|---|---|
| 6,600,249 B2 | 7/2003 | Nelson et al. |
| 6,955,141 B2 | 10/2005 | Santanam et al. |
| 7,008,184 B2 | 3/2006 | Bettencourt, Jr. et al. |
| 7,066,114 B1 | 6/2006 | Hannesen et al. |
| 7,121,368 B2 | 10/2006 | MacKelvie |
| 8,020,536 B2 | 9/2011 | Kardos |
| 8,104,435 B2 | 1/2012 | Schwartz et al. |
| 2006/0095178 A1 | 5/2006 | Guilfoyle et al. |
| 2011/0094219 A1 | 4/2011 | Palm |
| 2011/0114066 A1 | 5/2011 | Vasallo et al. |
| 2012/0181001 A1* | 7/2012 | Marsh ................. F01P 3/20 165/121 |

* cited by examiner

| MODE | FAN | GRILLE SHUTTERS |
|---|---|---|
| 1 | ADJUST | MAINTAIN |
| 2 | MAINTAIN | ADJUST |
| 3 | ADJUST | ADJUST |

CONDENSATION CONTROL IN A CHARGE AIR COOLER BY CONTROLLING CHARGE AIR COOLER TEMPERATURE

CROSS REFERENCE TO RELATED APPLICATION

The present application is a continuation of U.S. patent application Ser. No. 13/664,248 entitled "CONDENSATION CONTROL IN A CHARGE AIR COOLER BY CONTROLLING CHARGE AIR COOLER TEMPERATURE," filed on Oct. 30, 2012, now U.S. Pat. No. 9,664,104. The entire contents of the above referenced application are hereby incorporated by reference in their entirety for all purposes.

BACKGROUND/SUMMARY

Turbo charged engines utilize a Charge Air Cooler (CAC) to cool compressed air from the turbocharger, before it enters the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. When the intake air includes recirculated exhaust gasses, the condensate can become acidic and corrode the CAC housing. The corrosion can lead to leaks between the air charge, the atmosphere, and possibly the coolant in the case of water-to-air coolers. Condensate may collect at the bottom of the CAC, and then be drawn into the engine at once during acceleration (or tip-in) increasing the chance of engine misfire.

Other attempts to address condensate formation include restricting intake air travelling through the CAC or restricting ambient air flow to the CAC. One example approach is shown by Craig et al. in U.S. Pat. No. 6,408,831. Therein, the intake air temperature is controlled by an ambient air flow restriction system and an intake air flow restriction system. A controller defines the position of these restriction devices and is connected to a plurality of sensors which measure different variables such as ambient air and intake air temperatures.

However, the inventors herein have recognized potential issues with such systems. As one example, even with adjustments to the above restriction devices, condensate formation may not be sufficiently addressed. Specifically, controlling restriction devices in response to intake or ambient air temperature alone may not sufficiently control condensate formation or change charge air cooler effectiveness. Further, controlling restriction devices based on intake or ambient air temperature alone may result in increased vehicle drag and engine over temperature conditions. Maintaining temperatures at a certain level such that condensate formation is low may result in keeping the restriction devices closed or open for long periods of time. If restriction devices are closed for a prolonged period, this may result in an increase in engine temperatures over optimal levels. Conversely, if the devices are open for a prolonged period, increased air flow is received through the vehicle front end, increasing the aerodynamic drag on the vehicle.

In one example, the issues described above may be addressed by a method for controlling a vehicle electric fan, comprising: adjusting fan rotation speed or rotation direction in response to a temperature at a charge air cooler outlet. The fan may be adjusted to increase the temperature at the charge air cooler outlet (e.g., decrease rotation speed, turn rotation off, or reverse rotation direction) during a first set of conditions, and may be adjusted to decrease the temperature at the charge air cooler outlet (e.g., increase rotation speed) during a second, different, set of conditions. In this way, by controlling the temperature at the charge air cooler outlet, condensate formation may be managed, as one example.

In addition to condensate formation, an electric fan may be adjusted in response to engine cooling parameters, outside weather conditions, and non-driven vehicle conditions, such as deceleration. Adjustment of the electric fan may be coordinated with grille shutter operation in order to optimize condensate control, as well as engine cooling and fuel economy. For example, the inventors herein have identified approaches that enable the electric fan and grille shutters to still be adjusted in a way that improves fuel economy (by reducing drag) and reduces energy losses, but that also maintains engine coolant temperature control to avoid over temperature and reduces condensate formation (by maintaining CAC outlet temperature within a threshold range).

Specifically, the electric fan and grille shutters may be operated in different modes based on temperature at the CAC outlet and vehicle speed. Choice of operation mode may be further based on engine coolant temperatures and non-driven vehicle conditions. In each mode, the electric fan, grille shutters, or both the electric fan and grille shutters may be adjusted in response to the above listed parameters. In this way, the electric fan and grille shutters may be adjusted to increase or decrease CAC outlet temperature while optimizing vehicle fuel economy and energy savings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for adjusting a vehicle fan, such as a mechanical or electric fan, in response to a temperature at a charge air cooler (CAC) outlet. Electric fan operation may be coordinated with grille shutter operation for a vehicle engine system, such as the engine system in FIG. 1, to increase engine cooling, reduce condensate formation in the CAC, and optimize vehicle fuel economy. Three modes of operation for adjusting the electric fan and grille shutters are shown in FIG. 8. Opening the grille shutters and increasing the rotation speed of the electric fan, such as those shown in FIG. 2, increases air flow through the vehicle front end, supplying cooling air flow to a radiator and CAC. Modifying the speed or rotation direction of the electric fan may change the temperature of the CAC. This may increase or decrease condensate formation in the CAC (such as shown in FIG. 3). An engine controller may be configured to perform a control routine, such as the routines of FIG. 4-6, to adjust the electric fan and grille shutter state based on a non-driven vehicle condition, CAC outlet temperature, outside weather conditions, and engine temperatures. In this way, condensate formation, CAC corrosion, and engine misfire may be reduced. Example electric fan operations in response to engine coolant temperature, vehicle speed, CAC outlet temperature, and outside weather conditions are described with reference to FIG. 7.

Figure 1:
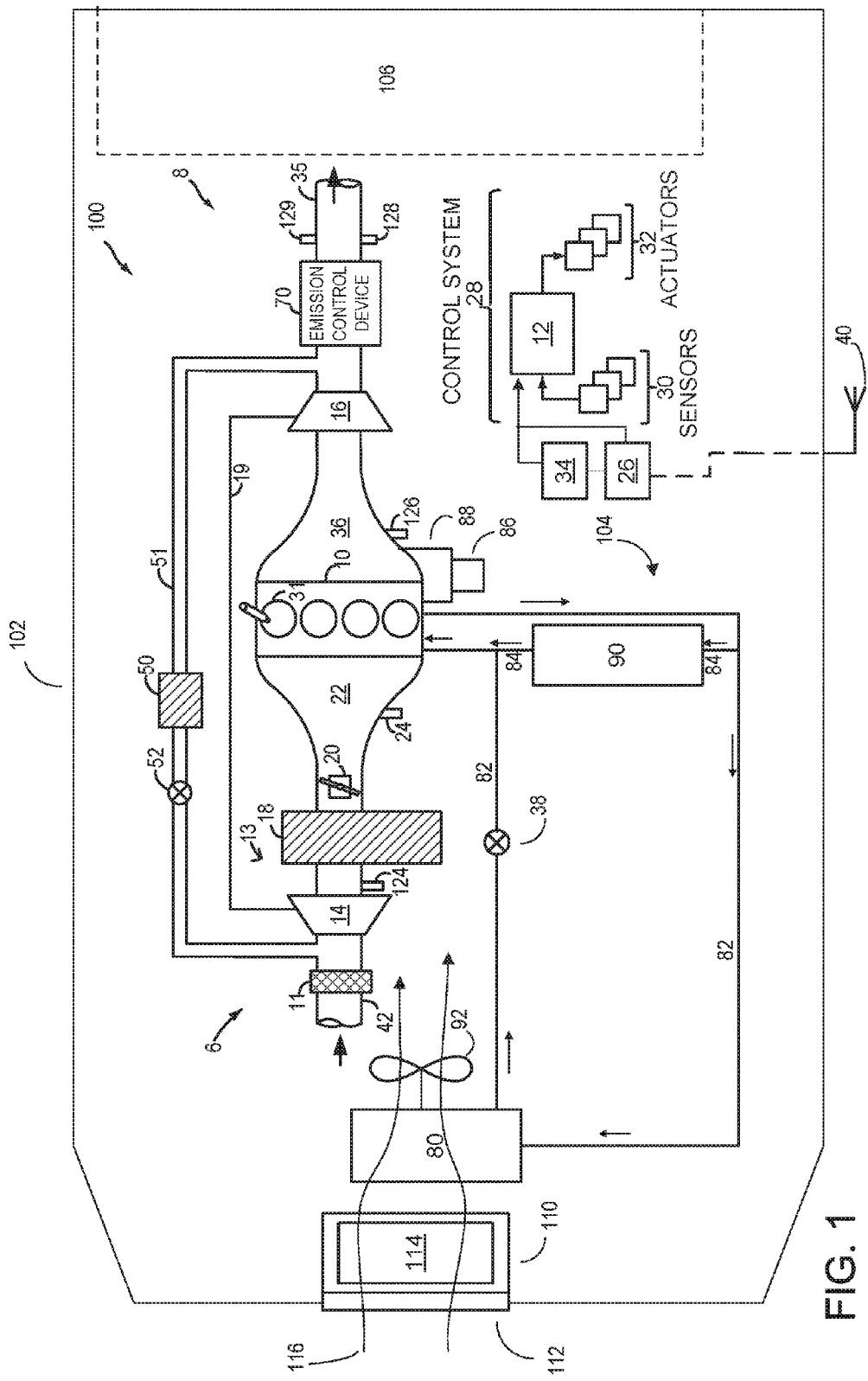
FIG. 1 shows a schematic diagram of a grille shutter system, electric fan system, engine, and associated components in a vehicle.

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient air flow 116 from outside the vehicle may enter engine 10 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. Thus, as elaborated herein with reference to FIGS. 3-8, the temperature at the CAC outlet may be controlled such that condensate formation and engine misfire events are reduced.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the coolant line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12 described in more detail hereafter. In one example, the engine cooling fan may also direct cooling airflow toward CAC 18. Alternatively, electric fan 92 may be coupled to the engine accessory drive system, driven by the engine crankshaft. In other embodiments, electric fan 92 may act as a dedicated CAC fan. In this embodiment, the electric fan may be coupled to the CAC or placed in a location to direct airflow directly toward the CAC. In yet another embodiment, there may be two or more electric fans. For example, one may be coupled to the radiator (as shown) for engine cooling, while the other may be coupled elsewhere to direct cooling air directly toward the CAC. In this example, the two or more electric fans may be controlled separately (e.g., at different rotation speeds) to provide cooling to their respective components.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others. In addition, controller 12 may receive data from the GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 compares the received humidity data to threshold values and determines the appropriate electric fan and grille shutter adjustment. For example, if humidity is greater than a defined threshold, one or more of the grille shutters may be closed and the electric fan may be turned off.

In other embodiments, the presence of rain may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC and adjust vehicle actuators, such as electric fan 92 and/or grille shutter system 110. Adjustments to these systems are described in more detail below with reference to FIGS. 3-8.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving ambient air flow 116 through or near the front end of the vehicle and into the engine compartment. Such ambient air flow 116 may then be utilized by radiator 80, electric fan 92, and other components to keep the engine and/or transmission cool. Further, the ambient air flow 116 may reject heat from the vehicle air conditioning system and can improve performance of turbo-charged/super-charged engines that are equipped with CAC 18 that reduces the temperature of the air that goes into the intake manifold/engine. The electric fan 92 may be adjusted to further increase or decrease the air flow to the engine components. Furthermore, a dedicated CAC fan may be included in the engine system and used to increase or decrease air flow to the CAC.

Figure 2:
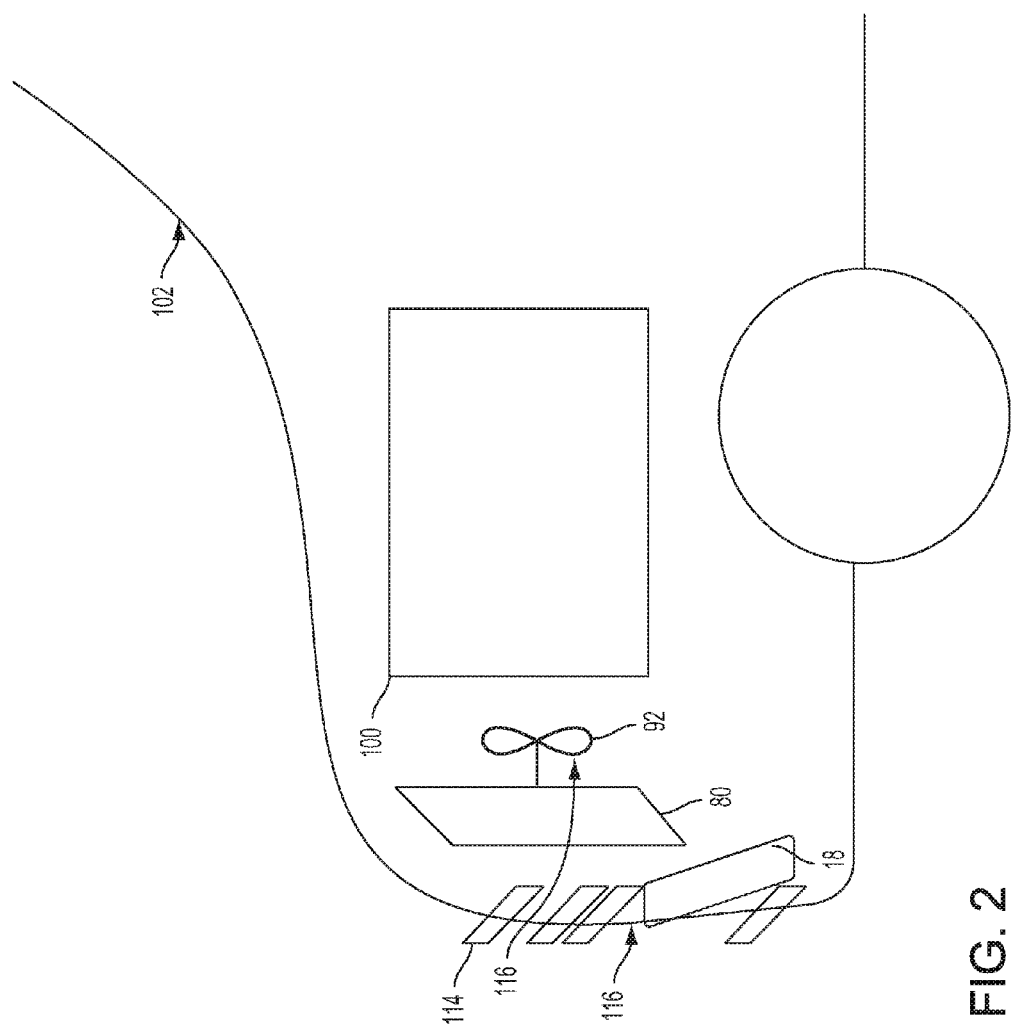
FIG. 2 shows an example of the CAC, radiator, electric fan, and engine location within a vehicle with respect to the grille shutters and associated ambient air flow.
Figure 3:
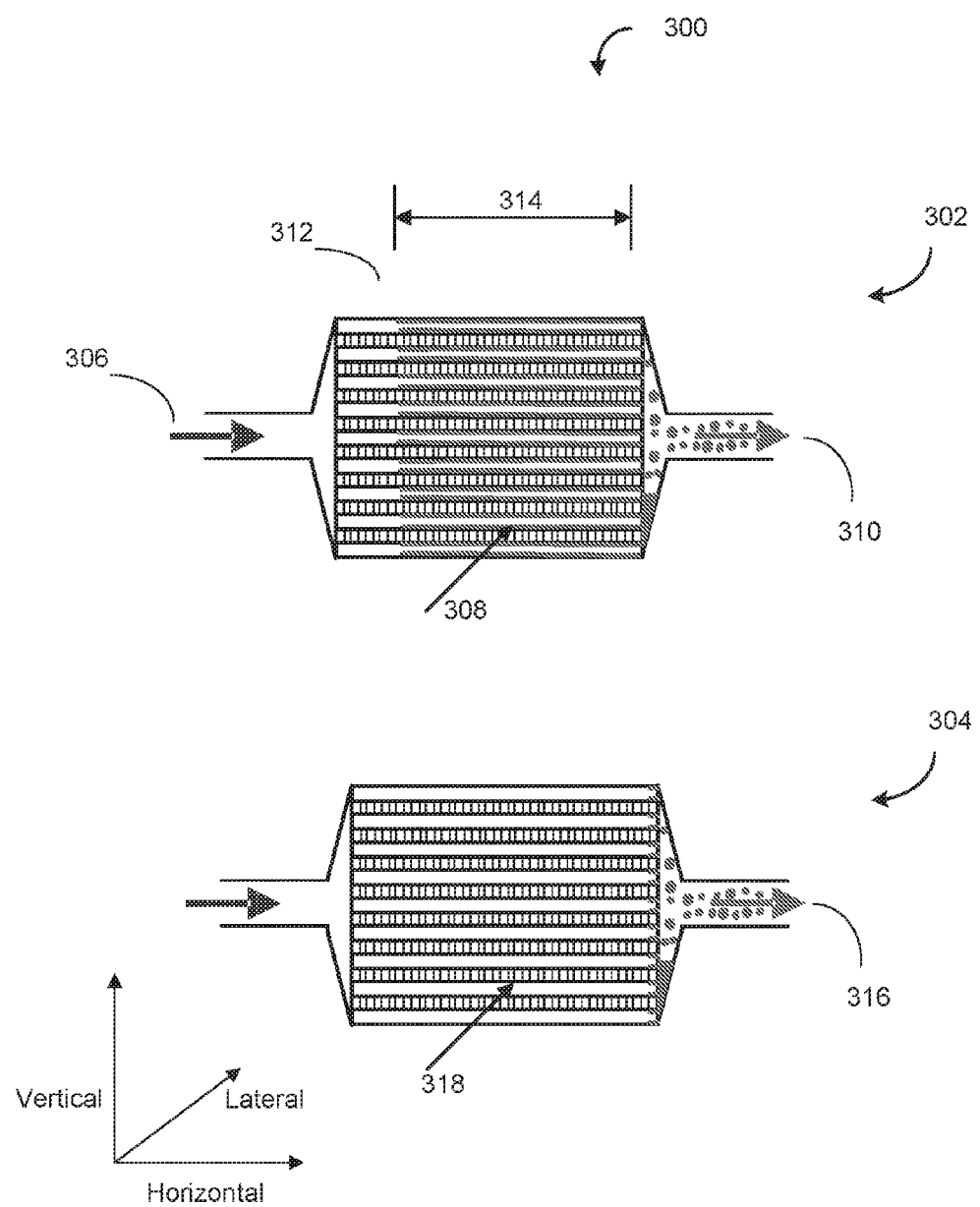
FIG. 3 shows a schematic example of changing condensate formation in the CAC, based on CAC outlet temperature.

FIG. 2 shows an example of the CAC 18, radiator 80, electric fan 92, and engine system 100 locations within a vehicle 102 with respect to the grille shutters and associated ambient air flow 116. Other under hood components (fuel system, batteries, etc.) may benefit from the cooling air flow as well. Thus, grille shutter system 110 and electric fan 92 may assist cooling system 104 in cooling internal combustion engine 10. Grille shutter system 110 comprises one or more grille shutters 114 configured to adjust the amount of air flow received through grille 112.

Grille shutters 114 may cover a front region of the vehicle spanning from just below the hood to the bottom of the bumper, for example. By covering the CAC intake, drag is reduced and entry of external cooling air into the CAC is reduced. In some embodiments, all grille shutters may be moved in coordination by the controller. In other embodiments, grille shutters may be divided into sub-regions and the controller may adjust opening/closing of each region independently. For example, a first region may include grille shutters that largely affect drag while another affects entry of air into the CAC. In one example, the first sub-region may span from just below the hood to the top of the bumper, while the second sub-region may span from the top of the bumper to the bottom of the bumper. Each sub-region may contain one or more grille shutters. In some examples, each region may contain the same number of grille shutters, while in other examples one sub-region contains more than the other. In one embodiment, the first sub-region may contain multiple grille shutters, while the second sub-region contains one grille shutter. In an alternate embodiment, the first sub-region may only contain one grille shutter, while the second sub-region contains multiple grille shutters.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an opened position and a closed position to provide air flow for cooling engine compartment components at the least loss in fuel economy. This is because closing and/or partially closing grille shutters 114 reduces an amount of air flow received through grille 112, thus reducing the aerodynamic drag on the vehicle. Maintaining the grille shutters in an open position allows for sufficient engine cooling; however, this may also increase drag on the vehicle and decrease fuel economy. On the other hand, closing the grille shutters decreases drag and improves fuel economy; however, this may not allow for sufficient engine cooling. Thus, control of the grille shutters may be based on multiple vehicle operating conditions, discussed further below. In some embodiments, the grille shutters may be used for CAC condensate control only. In this case, grille shutter operation may have little to no aerodynamic benefit.

When the grille shutters are open, electric fan 92 may be used to increase or decrease cooling ambient air flow 116 to engine components. For example, by increasing the electric fan rotation speed, the amount and rate of air flow to the engine will increase. Conversely, by decreasing the fan rotation speed, the rate of air flow to the engine decreases. In another example, the electric fan may be turned on at a low rotation speed to decrease CAC efficiency and increase CAC outlet temperature. Specifically, at low speeds, the electric fan may not be effective in cooling. However, the blades of the fan may act to resist airflow to the radiator and CAC. In this way, ambient air flow velocities directly affect CAC effectiveness and CAC outlet temperature. Thus, by changing fan rotation speed, CAC efficiency and outlet temperature may be altered. When grille shutters are closed, little cooling ambient air flow enters the grille. However, the electric fan may still operate to provide air flow. In addition to controlling rotation speed, the electric fan may also change rotation direction. The blades of the fan may be designed such that rotation in a first direction directs air flow toward engine components. In the following descriptions, this will serve as the normal or base direction for fan operation. Rotation of the fan blades in a second direction, opposite the first direction, may direct air flow away from engine components. In this way, fan rotation direction may also be used to alter the cooling air flow reaching engine components and, subsequently, CAC efficiency and outlet temperature.

In some embodiments, control system 28 may be configured to adjust opening of grille shutters 114 responsive to vehicle operating conditions. Adjusting opening of grille shutters 114 may include opening one or more of the grille shutters, closing one or more of the grille shutters, partially opening one or more of the grille shutters, partially closing one or more of the grille shutters, adjusting opening and closing timing, etc. As an example, controller 12 may be communicably connected to grille shutter system 110, and may have instructions stored thereon to adjust opening of grille shutters 114. In this way, controller 12 may adjust vehicle grille shutters by increasing or decreasing grille shutter opening.

Control system 28 may be further configured to operate electric fan 92 responsive to vehicle operating conditions. Electric fan 92 operation may include increasing the fan rotation speed, decreasing the fan rotation speed, stopping the fan rotation, reversing the fan rotation direction, adjusting rotation on/off timing, etc. As an example, controller 12 may be communicably connected to electric fan 92, and may have instructions stored thereon to adjust the rotation of electric fan 92.

Electric fan operation may be adjusted in response to a variety of system variables, including engine temperatures, vehicle driving conditions, charge air temperature at the CAC outlet (CAC outlet temperature), and outside weather conditions. Condensate formation in the CAC may include an amount of condensate and/or a condensate formation rate, where CAC outlet temperature may be one of several variables used to estimate and/or calculate condensate formation. In some embodiments, grille shutters may be adjusted in response to all or a few of the above system variables. Adjustment of the electric fan may be coordinated with grille shutter operation in order to optimize CAC condensate control, as well as engine cooling and fuel economy. For example, controller 12 may be communicably connected to both electric fan 92 and grille shutter system 110. Controller 12 may have instructions stored thereon to adjust operation of electric fan 92 or grille shutter system 110, based on the other's current condition and the above listed system variables. Operation of the electric fan and grille shutters may be in response to one of these system variables, even if other variables remain within a normal range. In this way, all variables may be assessed to determine the optimal electric fan rotation speed or direction, as well as grille shutter opening, for vehicle cooling, CAC corrosion prevention, misfire prevention, and increased fuel economy. Additional examples and explanation of electric fan and grille shutter operation are provided in FIGS. 7-8 and explained further below.

Under some conditions, the electric fan 92 and grille shutter system 110 may be adjusted responsive to vehicle driving conditions, such as whether the vehicle is in a driven or a non-driven condition. The driven condition may include when the wheels are applying positive force propelling the vehicle forward. The non-driven condition may include when the wheels are absorbing vehicle inertia and generating a negative force against forward vehicle motion. In one embodiment, the non-driven vehicle condition may include a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used to indicate a slower region ahead, a downgrade approaching, etc.

In some cases, during deceleration, the vehicle may be shut down and the transmission disconnected from the engine to improve fuel economy. In this situation, additional cooling of the engine is needed. Opening of the grille shutters and increasing electric fan speed at the beginning of deceleration in this case may allow for pre-cooling of the engine, keeping engine temperatures low. This may also allow the grille shutters to remain closed for a longer period during the following driven conditions, reducing vehicle drag and again improving fuel economy.

Further, electric fan 92 and grille shutter system 110 may be adjusted to alter condensate formation within the CAC 18. A plurality of sensors 30 may obtain CAC data, such as inlet and outlet pressures and temperatures. A controller 12 may use this data, along with ambient air conditions (e.g. temperature and relative or specific humidity) and vehicle data (e.g. vehicle speed), to determine the rate and the amount of condensation in the CAC. In some cases, ambient relative humidity may be calculated or assumed to be 100% at all ambient temperature conditions. This eliminates the need for a humidity sensor. However, if a humidity sensor is available, actual (e.g., real-time) humidity data may be used as well.

Controller 12 may use the sensor data described above, along with an algorithm, to calculate the amount of condensate in the CAC. The condensation calculation may begin by calculating the saturation vapor pressure at the CAC outlet as a function of the CAC outlet temperature and pressure. The algorithm then calculates the mass of water at this saturation vapor pressure. The mass of water in the air is then determined from ambient air conditions. Finally, the condensation rate (rate of condensate formation) at the CAC outlet is determined by subtracting the mass of water at the saturation vapor pressure condition at the CAC outlet from the mass of water in the ambient air. By determining the amount of time between condensate measurements, controller 12 may determine the amount of condensate within the CAC since the last measurement. The current condensate amount in the CAC may be calculated by adding this value to the previous condensate value and then subtracting any condensate losses since the last calculation (amount of condensate removed). Condensate losses may be assumed to be zero if the CAC outlet temperature remained above the dew point.

In another embodiment, the electric fan and grille shutters may be adjusted to change the temperature at the CAC outlet. Specifically, by adjusting the electric fan and grille shutters to alter the cooling air flow to the CAC, CAC outlet temperature may be increased or decreased. The controller may collect sensor data (e.g., CAC temperatures and boost pressure), along with ambient air conditions (e.g. temperature and relative or specific humidity) and vehicle data (e.g. vehicle speed, engine load). Then, using algorithms and methods for estimating and/or calculating condensate formation, a threshold CAC outlet temperature range may be defined. In one example, a condensation formation value is mapped to CAC outlet temperature and a ratio of CAC pressure to ambient pressure. In another example, a condensation rate percent of air mass may be mapped to CAC outlet temperature. Engine load may be used to convert the condensation rate percent of air mass to a condensate formation rate in the CAC. Engine load may be a function of air mass, torque, accelerator pedal position, and throttle position, and thus may provide an indication of the air flow velocity through the CAC. For example, a moderate engine load combined with a relatively cool CAC outlet temperature may indicate a high condensation formation value, due to the cool surfaces of the CAC and relatively low intake air flow velocity. The map may further include a modifier for ambient temperature and boost pressure. Controller 12 may use this map to determine a first threshold CAC outlet temperature. This first threshold temperature, T1, may be defined such that above this temperature, condensate may be forming at a rate which may increase the risk of CAC corrosion and/or engine misfire events. In this way, a threshold condensate formation rate may be set and further based on ambient humidity, outside weather conditions, and engine operating conditions. A second, higher, threshold CAC outlet temperature may be defined based on engine operating conditions. For example, this second threshold temperature, T2, may be defined based on the minimum air charge temperature required for combustion.

In yet another embodiment, the first threshold temperature, T1, may be defined based on the dew point temperature. Specifically, the controller may determine the dew point temperature of the CAC outlet, based on pressure and humidity. First threshold temperature, T1, may then be defined such that CAC outlet temperature remains above the dew point temperature. In one example, first threshold temperature T1 may be the dew point temperature of the CAC outlet. In another example, first threshold temperature T1 may be something slightly higher than the dew point temperature at the CAC outlet.

In this way, electric fan operation and grille shutter opening may be adjusted to maintain CAC outlet temperature between first threshold temperature T1 and second threshold temperature T2. In one example, if CAC outlet temperature is less than first threshold temperature T1, the controller may decrease cooling to the CAC by decreasing fan speed, turning the fan off, or reversing the fan rotation direction. Alternatively, or additionally, the controller may decrease grille shutter opening or close the grille shutters to reduce CAC cooling. In another example, if the CAC outlet temperature is greater than the second threshold temperature, T2, the controller may increase cooling to the CAC by turning the fan on or increasing fan speed. Alternatively, or additionally, the controller may increase grille shutter opening.

The position of grille shutters 114 may be further altered by current or forecasted weather conditions. For example, adjusting closing of one or more of the grille shutters 114 can be in response to condensate-forming weather conditions. Condensate-forming weather conditions may include rain, humidity, cool temperatures, or a combination thereof. The weather conditions may be provided via the in-vehicle communications and entertainment system 26 or GPS 34. Similarly, the operation of electric fan 92 may be adjusted in response to current or forecasted weather conditions. For example, fan rotation may slow down or stop in response to condensate-forming weather conditions. In other embodiments, the presence of rain may be inferred from rain sensors (e.g., on/off signal of windshield wipers) and used to adjust electric fan operation and grille shutter position.

Further, in some embodiments, the amount of adjustment of electric fan 92 and grille shutters 114 may depend on the degree of the non-driven vehicle condition, the number of degrees outside the CAC outlet temperature threshold range, or the degree of condensate-forming weather conditions, and combinations thereof. For example, during greater deceleration, a degree of opening of grille shutters 114 may be increased and/or a timing of opening the grille shutters 114 may be made earlier, allowing for greater air flow to assist in cooling the engine so that subsequent acceleration with the grille shutters closed can be prolonged. In this example, the rotation speed of electric fan 92 may increase to a greater degree or begin earlier, providing additional engine cooling. As another example, if the GPS 34 or in-vehicle communications and entertainment system 26 predicts a small amount of rainfall and only moderately-humid conditions, an opening of the grille shutters 114 may be reduced. In this case, fan rotation may be slowed to a degree, stopped, or possibly reversed direction.

Moreover, in some embodiments, electric fan 92 and grille shutter system 110 may be adjusted based on engine temperature, a non-driven vehicle condition, condensate formation within the CAC, and CAC outlet temperature. In one example, controller 12 may be configured to monitor engine temperature, for example, monitoring a coolant temperature and comparing it to threshold values. In this example, the electric fan may be turned on when engine coolant temperatures increase above a threshold. However, in some embodiments, the electric fan may turn on in response to condensate formation within the CAC or CAC outlet temperature above a threshold, even if engine coolant temperatures have not increased above the set threshold. In this way, the electric fan may turn on or off in response to condensate formation in a CAC and CAC outlet temperature when normal fan operation in response to engine temperatures alone would have dictated the opposite fan control. Additional methods of adjusting electric fan 92 and grille shutter system 110 are described in more detail with reference to FIGS. 4-8. Adjusting the fan and grille shutters in this way provides sufficient engine cooling, while reducing vehicle drag, reducing condensate formation, and avoiding stagnation of the dew point in the CAC. This may help to increase vehicle fuel economy and reduce corrosion of the CAC and engine misfire.

In one example, when air mass flow rates increase above a threshold level, condensate may be stripped from the CAC into the engine (purged from the CAC). Thus, if the air mass flow is above the velocity (threshold level) for the condensate to collect in the CAC, the grille shutters and/or electric fan may be opened to provide sufficient air charge cooling that may be needed for high air mass flow rate engine operation. Specifically, the moderate to high heat generated by the engine under high air mass flow conditions may require additional engine cooling. Thus, the grille shutters may be opened and/or the fan may be turned on to increase cooling to the engine without worrying about increased condensate formation in the CAC.

FIG. 3 shows a schematic example of condensate formation in the CAC. Two CAC examples (302, 304) are shown at 300 with different CAC outlet temperatures (air charge temperature). In the first CAC 302, hot charge air from the compressor 306 enters the CAC, cools as it travels through the CAC, and then exits CAC outlet 310 to pass though the throttle valve 20 and into the engine intake manifold 22. Ambient air flow 308 enters via the grille shutter openings and passes across the CAC, in the lateral direction, to aid in cooling the charge air. The velocity of this air flow may depend on vehicle and electric fan 92 speed. Downstream, in the horizontal direction, of the CAC inlet, a relatively large amount of condensate 314 forms in the CAC 302. In this case, the temperature at the CAC outlet 310 may be lower than first threshold temperature T1. By adjusting the position of the grille shutters 114 and/or the rotation speed or direction of electric fan 92, the ambient air flow 308 may be altered, thus changing the effectiveness of the CAC and the temperature at the CAC outlet 310. In the example of CAC 302, closing one or more of the grille shutters results in decreased ambient air flow 308, decreasing the cooling effectiveness of the CAC 302, and increasing the temperature at the CAC outlet 310. Reducing the rotation speed, stopping, or reversing the rotation direction (so that it blows cooling air away from the CAC) of electric fan 92 may also decrease ambient air flow 308, increasing the temperature at the CAC outlet 310. Increasing the temperature at the charge air cooler outlet may decrease condensate formation in the CAC.

In the second example CAC cooler 304, the temperature at the CAC outlet 316 may be higher than second threshold temperature T2. In this example, the temperature at the CAC outlet 316 may be decreased by increasing the ambient air flow 318. By adjusting the position of the grille shutters 114 and/or the rotation speed or direction of electric fan 92, the ambient air flow 318 may be increased. Opening one or more of the grille shutters may result in increased ambient air flow 318, increasing the cooling effectiveness of the CAC 302, and decreasing the temperature at the CAC outlet 310. Turning on or increasing the rotation speed of electric fan 92 may also increase ambient air flow 318, decreasing the temperature at the CAC outlet 316.

Determining whether to adjust fan operation, grille shutter position, or both to change CAC outlet temperature and efficiency may depend on other vehicle or outside conditions. For example, if the vehicle is traveling at a high speed, the electric fan rotation may be increased first while keeping the grille shutters closed. This may allow increased cooling while increasing vehicle aerodynamics and fuel economy. However, if the fan alone cannot provide sufficient cooling, grille shutters opening may be increased. Alternatively, if vehicle speed is low, the grille shutters may be opened first to increasing cooling. Keeping the fan off may increase vehicle energy savings. Then, if opening the grille shutters alone cannot provide sufficient cooling, the electric fan may be turned on to increase cooling air flow. In another example, the CAC outlet temperature may need to be increased while engine temperatures are high. In this case, cooling to the CAC may be decreased by turning off the fan. However, the grille shutters may remain open in order to still allow engine cooling. Further details on coordinated grille shutter and electric fan control are presented at FIG. 8.

In some embodiments, the amount of condensate or rate of condensate formation may result in electric fan and/or grille shutter adjustment. For example, in regard to FIG. 3, the temperature of the air at the CAC outlet 310 may fall below first threshold temperature T1. In some examples, this may cause fan rotation speed to decrease and/or the grille shutters to close, reducing airflow to the CAC, thus reducing the efficiency of the CAC and increasing the temperature of the CAC outlet air. In other examples, fan speed may decrease and/or grille shutters may close after the temperature at the CAC outlet 310 location falls below first threshold temperature T1 for longer than a threshold duration. The threshold duration may be adjusted based on vehicle operating conditions. For example, if the vehicle speed is high, rate of condensate formation may increase, requiring a shorter threshold duration at that position. Alternatively, if the rate of condensate formation is slow, then the threshold duration at that position may be increased.

The operation of electric fan 92 and grille shutter system 110 may be based on the other's current condition, along with engine temperatures, vehicle driving conditions, the amount and rate of condensate formation in the CAC, the CAC outlet temperature, and outside weather conditions. In this way, all variables may be assessed to determine the optimal combination of electric fan operation and grille shutter position, for vehicle cooling, CAC corrosion prevention, misfire prevention, and increased fuel economy. Examples of this operation will be described below with regard to FIGS. 4-8.

Figure 4:
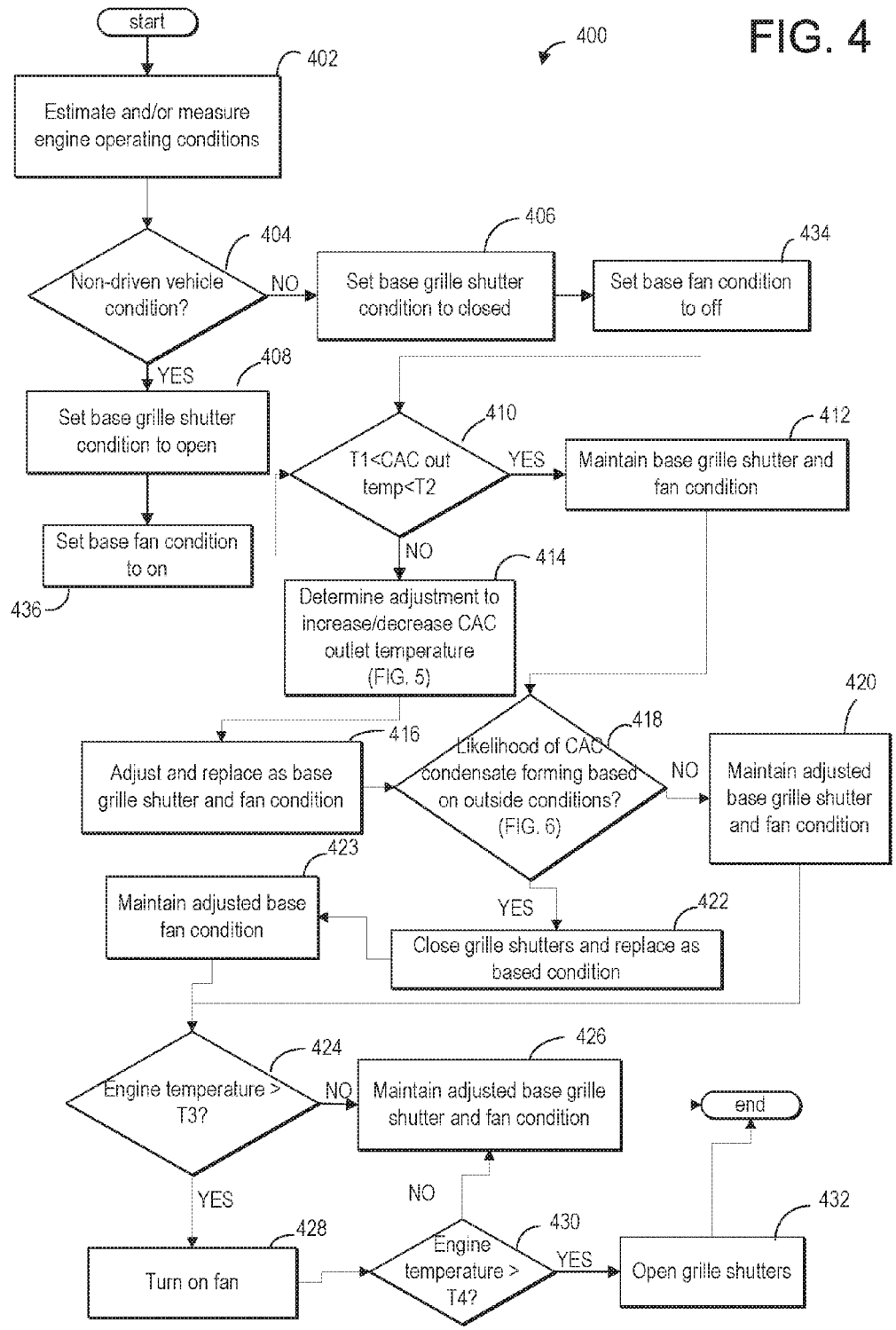
FIG. 4 shows a high level flow chart of a method for controlling an electric fan and adjusting grille shutter position based on a non-driven vehicle condition, a temperature at the CAC outlet, outside weather conditions, and engine temperatures.

Now turning to FIG. 4, an example method 400 is shown for adjusting electric fan (herein referred to as "fan") operation and grille shutter position based on a non-driven vehicle condition, CAC outlet temperature, outside weather conditions, and engine temperatures. At 402, the routine includes estimating and/or measuring engine operating conditions. These include, for example, engine speed and load, torque demand, boost, manifold pressure (MAP), manifold air-charge temperature (MCT), air-fuel ratio (lambda), fuel alcohol content, barometric pressure, ambient conditions (e.g., ambient air temperature, pressure, humidity, etc.), engine pre-ignition history, etc. At 404, based on the estimated conditions, it may be determined if there is a non-driven vehicle condition. Such a determination may include detecting a non-driven vehicle condition such as a deceleration condition, a braking condition, a tip-out condition, a rate of change of engine speed being less than a predetermined threshold, a braking signal from an adaptive cruise control system (that senses a distance to a vehicle directly in front of the present vehicle and automatically actuates vehicle brakes to maintain a threshold separation from the preceding vehicle), or another type of condition signaling a non-driven vehicle condition. As an example, the non-driven vehicle condition may be when the depression amount of the driver's braking pedal is less than a threshold value. As another example, the non-driven vehicle condition may be when the driver's braking effort (e.g., a force on the braking pedal) is greater than a threshold value. As yet another example, the non-driven vehicle condition may be when the brake pressure is greater than a threshold value. As even another example, the non-driven vehicle condition may be when the actuation degree of the vehicle brakes (e.g., electrically actuated brakes) is greater than a threshold value.

Figure 5:
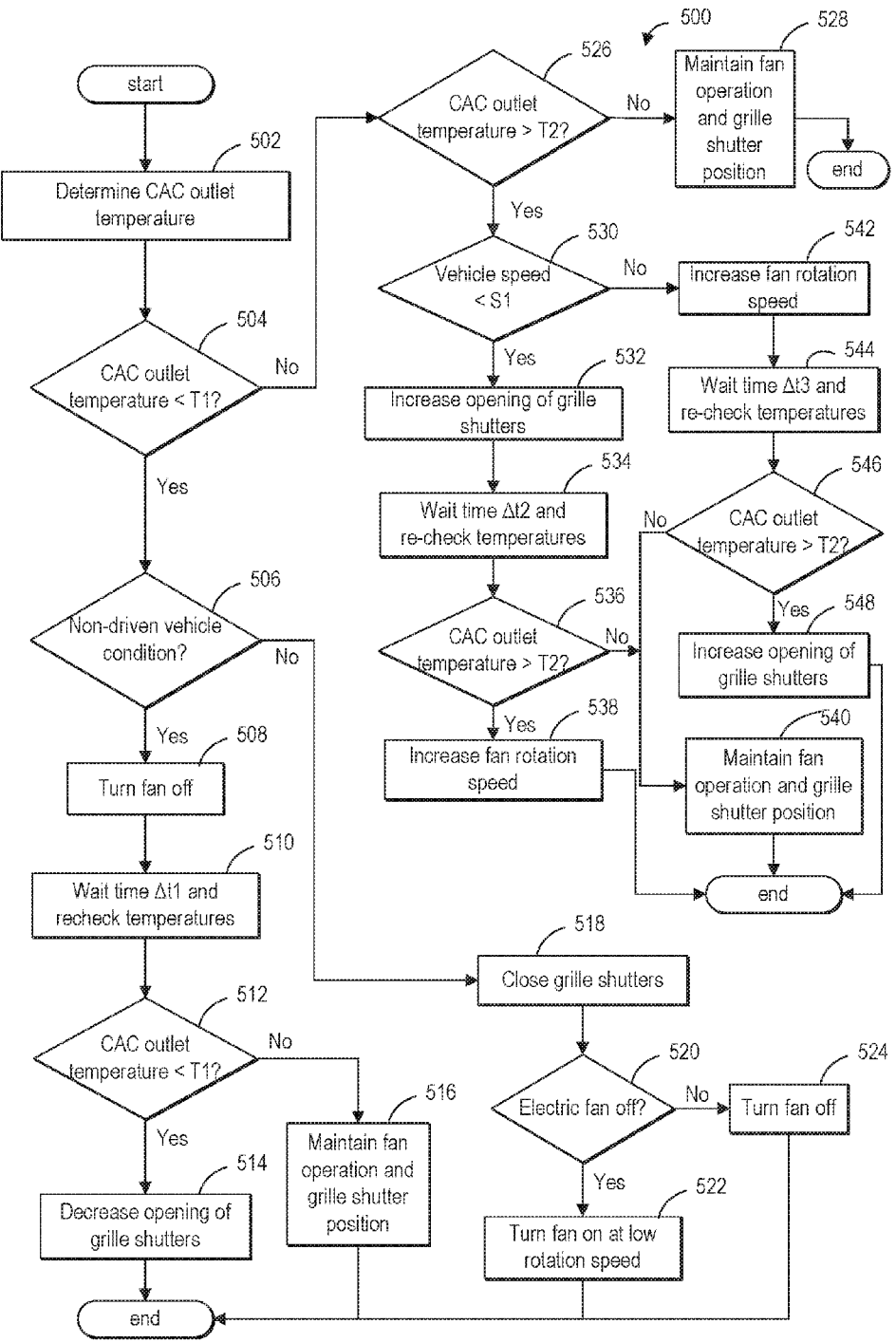
FIG. 5 shows a flow chart of a method for controlling an electric fan and adjusting grille shutter position based on CAC outlet temperature and vehicle speed.

If the vehicle does not have a non-driven vehicle condition (e.g., the vehicle is being driven), then method 400 proceeds to 406 and 434 where the controller sets the base grille shutter condition to closed and the base fan condition to off, respectively. However, if the vehicle does have a non-driven vehicle condition, then method 400 proceeds to 408 and 436 where the controller sets the base grille shutter condition to open and the base fan condition to on. The speed of the fan may also be adjusted at this point, depending on the non-driven condition. For example, the fan speed may be higher for larger degrees of deceleration. From both 434 and 436, method 400 continues to 410 where the temperature at the CAC outlet is assessed. The routine determines whether the CAC outlet temperature is between temperature thresholds T1 and T2 (first threshold temperature T1 and second temperature threshold T2, as discussed above). This method is expanded upon in FIG. 5, discussed below. If it is determined at 410 that CAC outlet temperature is between temperature thresholds T1 and T2, then method 400 proceeds to 412 to maintain grille shutter position and fan operation at their base conditions. However, if it is determined at 410 that CAC outlet temperature is not between temperature thresholds T1 and T2, method 400 proceeds to 414 to determine the adjustment to the grille shutters and/or fan required to reduce or change condensate formation (FIG. 5). At 416, this adjustment is made and the new conditions are set as the base grille shutter and fan conditions.

The routine at 418 determines the likelihood that condensate will form in the CAC, based on outside weather conditions. This method is expanded upon in FIG. 6, explained further below. If, based on weather conditions, it is not likely for CAC condensate to form, the grille shutters and fan are maintained at the adjusted base condition at 420. However, if condensate is likely to form, the grille shutters are closed at 422, replacing the old base condition. The base fan condition may be maintained at 423. Method 400 continues on to 424 to check engine temperatures in relation to threshold values. For example, if the engine coolant temperature (ECT) increases above a maximum value, engine cooling assistance is required. If these temperatures are not above a threshold value (T3), then grille shutter position and fan operation are maintained at their adjusted base conditions at 426 and the routine ends. However, if temperatures are above a first threshold value, T3, the fan is turned on at 428. Engine temperatures are checked again at 430. If temperatures are above a second threshold value, T4, the grille shutters are opened at 432 and the routine ends. Otherwise, the fan remains on and the adjusted base grille shutter position is maintained at 426. In some embodiments, the second threshold value is greater than the first threshold value. In other embodiments, the first and second threshold values may be the same.

An example method 500 is shown in FIG. 5 for adjusting electric fan operation and grille shutter position based on a temperature at the CAC outlet. At 502, the routine determines the charge air temperature at the CAC outlet. The routine compares the CAC outlet temperature to first threshold temperature T1 at 504. If the CAC outlet temperature is less than first threshold temperature T1, the routine continues on to 506 where a non-driven vehicle condition (as discussed above in method 400) is determined. If a non-driven vehicle condition is confirmed at 506, the controller may turn off the electric fan at 508. Alternatively, at 508, the controller may decrease the fan rotation speed or reverse fan rotation direction to increase the CAC outlet temperature. Whether to decrease fan rotation speed, turn the fan off, or reverse fan rotation direction may depend on CAC outlet temperature and/or other engine operating conditions. For example, if the CAC outlet temperature is only slightly below first threshold temperature T1, the fan rotation speed may be decreased rather than turned off. In another example, if the vehicle is decelerating at a slower rate, the fan may be turned off or rotated in the reverse direction. This may allow the CAC outlet temperature to decrease while the grille shutters remain open to increase engine cooling during the non-driven condition (so shutters may stay closed longer during subsequent accelerations). In yet another example, if grille shutters are not present in the vehicle or are not functioning (e.g., grille shutters stuck open), the electric fan may be rotated in the reverse direction to pull heat back out of the engine compartment and warm the CAC.

Method 500 continues on to 510 to recheck CAC temperatures. The routine may wait a duration Δt1 between 508 and 510 to allow temperatures to change and equilibrate. Duration Δt1 may be based on an amount of condensate or rate of condensate formation in the CAC and/or engine operating conditions. Alternatively, Δt1 may be a set time duration. For example, if the rate of condensate formation is high, duration Δt1 may be shorter to reduce increased condensate formation. In another example, duration Δt1 may be longer if engine temperatures are higher and increased engine cooling is required. The CAC outlet temperature is assessed again at 512. If CAC outlet temperature is still below first threshold temperature T1, the controller may decrease the opening of the grille shutters. Alternatively, the controller may close the grille shutters completely, based on engine operating conditions. For example, if the CAC outlet temperature is a threshold amount below first temperature threshold T1, the grille shutters may close completely. However, if the CAC outlet temperature is not below first threshold temperature T1 at 512, the method continues on to 516 to maintain fan operation and grille shutter position, ending the method.

Returning to 506, if the CAC outlet temperature is below first threshold temperature T1 and there is not a non-driven vehicle condition, the controller may close the grille shutters at 518. The method continues on to 520 to determine if the electric fan is off. If the fan is off, the routine at 522 may turn the fan on at a low rotation speed. At low speeds, the blades of the fan may act to resist airflow and increase temperature at the CAC outlet. Alternatively at 522, the routine may wait a duration and then recheck CAC outlet temperature before turning the fan on. If the fan is not off at 520, the fan may be turned off at 524 to increase CAC outlet temperature. Alternatively, the controller may decrease fan rotation speed or reverse fan rotation direction. After making fan adjustments, the routine ends.

Returning to 504, if the CAC outlet temperature is not below first threshold temperature T1, the routine continues on to 526 to confirm if the CAC outlet temperature is greater than second threshold temperature T2. If the CAC outlet temperature is not above second threshold temperature T2, the routine at 528 maintains the base fan operation and grille shutter position determined in method 400. However, if the routine confirms that CAC outlet temperature is above second threshold temperature T2, vehicle speed is assessed at 530. If vehicle speed is less than speed threshold S1, the routine increases the opening of the grille shutters at 532 (or open grille shutters). Speed threshold S1 may be based on engine operating conditions and vehicle fuel and energy savings. For example, speed threshold S1 may be set such that above this speed, opening the grille shutters may decrease vehicle aerodynamics and decrease fuel economy. Alternatively, speed threshold S1 may be set such that below this speed, turning on the electric fan may increase vehicle energy expenditures. This energy expenditure may decrease vehicle efficiency more than the decreased aerodynamics caused by opening the grille shutters. Thus, in response to vehicle speed below speed threshold S1 at 530, vehicle grille shutters may be opened first at 532, rather than turning on the fan. At 534, the routine waits a duration Δt2 and then rechecks CAC outlet temperature. Duration Δt2 may be based on engine operating conditions, such as vehicle speed, or may be a set time duration. If CAC outlet temperature remains above second threshold temperature T2 at 536, the controller may increase fan rotation speed (or turn fan rotation on) at 538. However, if the temperature at the CAC outlet is no longer above second threshold temperature T2, the method continues on to 540 to maintain the fan operation and grille shutter position.

Returning to 530, if the vehicle speed is not less that speed threshold S1, the routine continues on to 542 to increase fan rotation speed (or turn fan on). At 544, the routine waits a duration Δt3 and then rechecks CAC outlet temperature. As for duration Δt2, Δt3 may be based on engine operating conditions, such as vehicle speed, or may be a set time duration. If CAC outlet temperature is still above second threshold temperature T2 at 546, the controller may increase the opening of the grille shutters at 548. However, if the CAC outlet temperature is no longer above second threshold temperature T2, the routine continues on to maintain fan operation and grille shutter position at 540 and then end.

In this way, an electric fan and vehicle grille shutters may be adjusted in response to the temperature at the CAC outlet. Adjustments may be further controlled based on vehicle speed and a non-driven vehicle condition. Example adjustments of the electric fan and grille shutters are presented at FIGS. 7-8.

Figure 6:
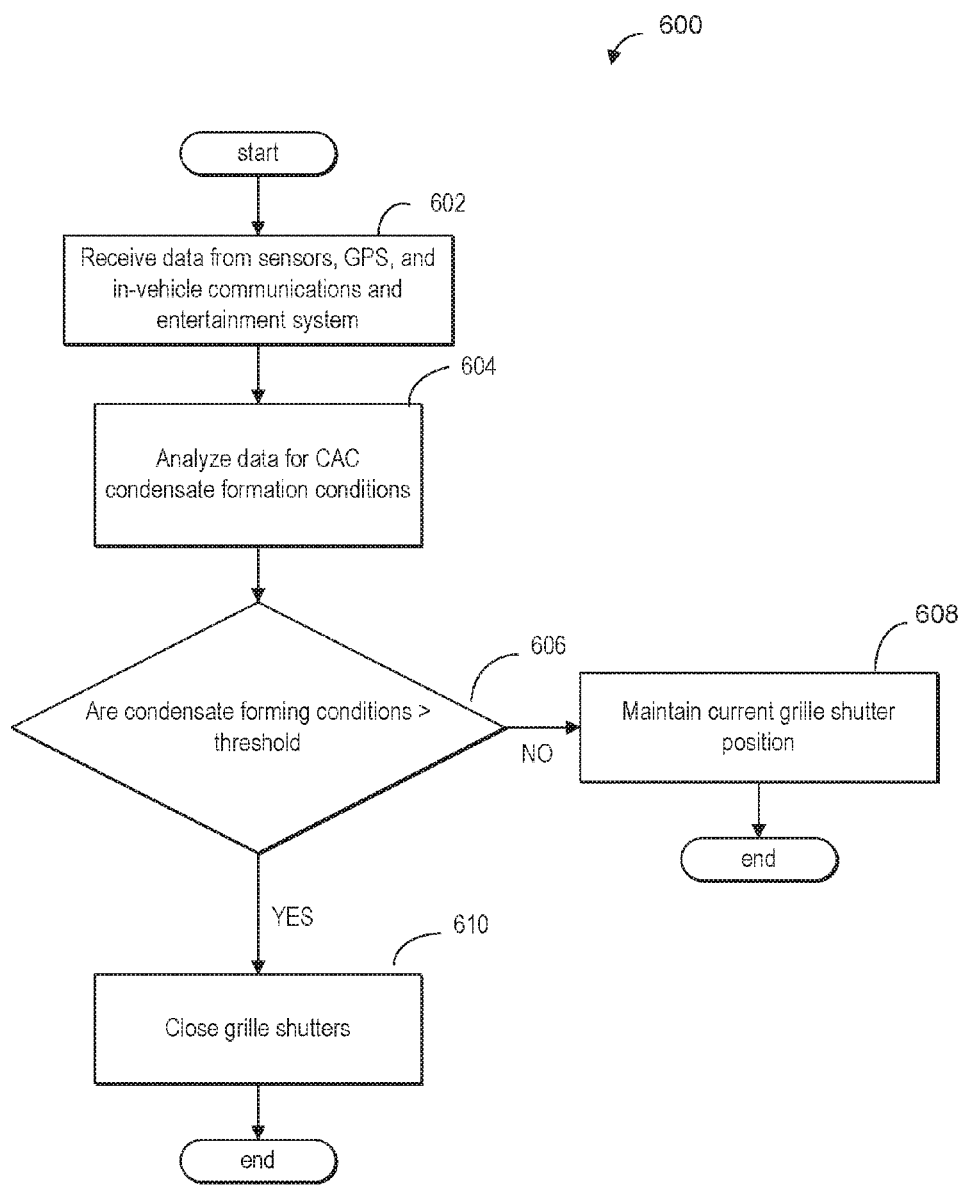
FIG. 6 shows a flow chart of a method for adjusting grille shutter position based on condensate forming conditions determined from outside weather conditions.

Turning now to FIG. 6, an example method 600 is shown for adjusting grille shutter position based on condensate forming conditions determined from outside weather conditions. At 602, the controller 12 receives data from a plurality of sensors 30, a GPS 34, and the in-vehicle communications and entertainment system 26. The retrieved data may include ambient air temperature and humidity, inferred rain conditions (from a windshield wiper on/off signal), and forecasted weather conditions for the road ahead or along the vehicle's trip plan. The controller 12 then analyzes the data for CAC condensation formation conditions at 604. These conditions may include rain, high humidity, low air temperature, or a combination thereof. If it is determined at 606 that condensate forming conditions are above threshold values, then grille shutters are closed at 610. Otherwise, the method maintains the current grille shutter position at 608. Threshold values may include a threshold temperature, humidity percentage, or precipitation amount in which condensate is likely to form within the CAC. After 610 and 608, the routine ends. If engine temperatures increase over threshold values during condensate-forming weather conditions, the electric fan may be turned on to provide engine cooling while still reducing condensate formation in the CAC.

Figure 7:
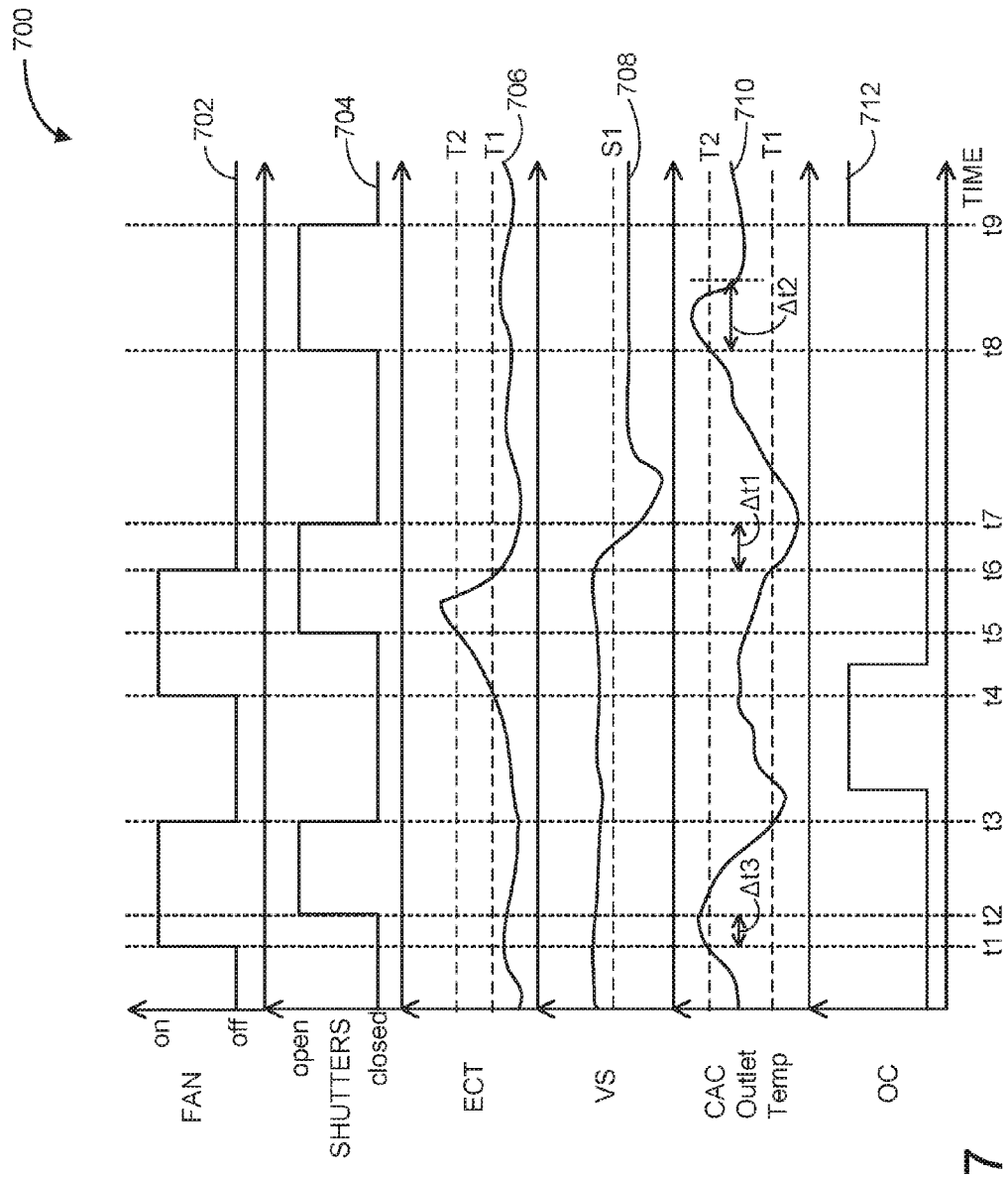
FIG. 7 shows a graphical example comparison of electric fan and grille shutter operation due to engine coolant temperature, vehicle speed, CAC outlet temperature, and outside weather conditions.
Figure 8:
FIG. 8 shows three modes of operation for the electric fan and grille shutters.

FIG. 7 shows an example graph 700 comparing electric fan and grille shutter operation due to engine coolant temperature, vehicle speed, temperature at a CAC outlet, and outside weather conditions. Graph 700 illustrates an example operation of an electric fan (fan) and grille shutters (shutters) at varying combinations of vehicle speed (VS) and outside weather conditions (OC) as a function of time (along the x-axis). Electric fan on/off and opening and closing of the grille shutters is based engine coolant temperature (ECT), vehicle speed, temperature at the CAC outlet (CAC outlet temp), and outside weather conditions. Graph 700 includes electric fan status (on or off) at plot 702, grille shutter status (open or closed) at plot 704, ECT at plot 706, VS at plot 708, CAC outlet temperature at plot 710, and an indication of outside weather conditions (OC) at plot 712. In this example, the electric fan and grille shutters are turned on/off and opened/closed, respectively, in response to system and outside variables. However, in some embodiments, fan and shutter control may include adjustments between the on/off and open/closed positions, respectively. In this case, the electric fan speed and degree of grille shutter opening may be adjusted by the system variables shown in graph 700. For example, electric fan speed may increase (e.g., proportionally) as ECT increases above a threshold. In another example, electric fan speed may change for different degrees of deceleration or different temperatures at the CAC outlet.

Prior to time t1, the cooling fan may not be operating and the grille shutters may be closed. At time t1, in response to CAC outlet temperature reaching second threshold temperature T2 (plot 710) and VS above speed threshold 51, the electric fan is turned on (plot 702). After a duration Δt3, CAC outlet temperature remains above second threshold temperature T2, causing the grille shutters to open (plot 704) at time t2. CAC outlet temperature decreases until time t3 when it falls below first threshold temperature T1. As a result, the grille shutters are closed and the fan is turned off. Between time t3 and time t4, condensate-forming weather conditions are indicated by an increase in OC (plot 712). The grille shutters remain closed during this time. In response to ECT reaching threshold value T3 at time t4, the electric fan is turned on (plot 702). ECT continues to increase until time t5 when ECT reaches threshold value T4 (plot 706). In response, the grille shutters are opened (plot 704) to increase cooling air flow. At time t6, the vehicle speed indicates a vehicle deceleration or vehicle braking condition (plot 708). At the same time, CAC outlet temperature falls below first threshold temperature T1. In response to the non-driven vehicle condition and CAC outlet temperature less than first threshold temperature T1, the fan is turned off (plot 702). Grille shutters remain open to increase engine cooling during the deceleration event. However, at time t7 (after waiting duration Δt1) CAC outlet temperature remains below first threshold temperature T1 (plot 710). Thus, even though the vehicle is still decelerating, the grille shutters are opened (plot 704) to increase CAC outlet temperature and reduce condensate formation.

Between time t7 and time t8 the temperature at the CAC outlet increases. At time t8, in response to the CAC outlet temperature increasing above second threshold temperature T2 and vehicle speed below speed threshold S 1, the grille shutters are opened. The fan may remain closed to increase energy savings of the vehicle. Cooling air from the open grill shutters decreases CAC outlet temperature below second threshold temperature T2 before duration Δt2 is reached. Thus, the fan remains off. At time t9, the controller receives indication of condensate-forming weather conditions (plot 712). In response, the grille shutters are closed at time t9 to reduce condensate formation.

Turning now to FIG. 8, three modes for operating the electric fan and vehicle grille shutters of an engine cooling system are shown in table 800. The engine cooling system may operate in three basic modes, based on vehicle driving conditions (e.g., vehicle speed and non-driven conditions), a temperature at the CAC outlet, outside weather conditions, and engine temperatures. In each of the cooling system modes, the electric fan may be turned on or off and the grille shutters may be actuated open or closed in response to the listed conditions and system variables. Additionally or alternatively, the electric fan speed may be increased or decreased, electric fan rotation direction may be changed, and grille shutter opening may be increased or decreased. In response to the above conditions and variables, the electric fan, grille shutters, or both may be adjusted. A controller (such as control system 28 of FIG. 1), may select a mode of operation for the engine cooling system, including settings for the electric fan and grille shutters, to optimize engine cooling, vehicle aerodynamics, vehicle energy expenditure, and CAC outlet temperature.

For example, the engine cooling system may be operated in a first mode (mode 1). During operation in the first mode (mode 1), electric fan operation is adjusted while grille shutter position is maintained. In one example, the engine cooling system may be operated in mode 1 in response to temperature at the CAC outlet greater than a second threshold temperature (such as second threshold temperature T2 as referenced in FIGS. 4, 5, and 7) while the vehicle is being driven at a speed higher than a threshold speed (such as threshold speed S1 as referenced in FIGS. 5 and 7). In this example, the fan may be turned on (or fan rotation speed increased) before opening the grille shutters to increase vehicle aerodynamics and fuel economy, while decreasing CAC outlet temperature. At higher vehicle speeds, fuel economy losses (due to driving with shutters open) may be greater than energy losses (due to electric fan operation). In another example, the engine cooling system may operate in mode 1 in response to temperature at the CAC outlet less than a first threshold temperature (such as first threshold temperature T1 as referenced in FIGS. 4, 5, and 7) during a driver pedal tip-out (non-driven condition). By turning off the fan and maintaining grille shutter position (open) during a non-driven condition, CAC outlet temperature may be increased while allowing additional cooling to the engine. This may help to decrease engine coolant temperatures so the grille shutters may remain closed (to improve aerodynamics) during subsequent vehicle acceleration. Alternatively in this example, fan rotation may be decreased or reversed direction to increase CAC outlet temperature. In yet another example, the engine cooling system may operate in mode 1 in response to an engine coolant temperature greater than a first threshold value (such as first threshold value T3 as reference in FIG. 4). In this example, the electric fan may be turned on (or rotation speed increased) to decrease engine temperature.

As another example, the engine cooling system may be operated in a second mode (mode 2). During operation in mode 2, the electric fan operation is maintained while grille shutter opening is adjusted. In one example, the engine cooling system may be operated in mode 2 in response to temperature at the CAC outlet greater than the second threshold temperature while the vehicle is being driven at a speed lower than a threshold speed. In this example, increasing grille shutter opening while maintaining fan operation (off) may reduce CAC outlet temperature while reducing energy expenditures. At lower vehicle speeds, energy losses (due to electric fan operation) may be greater than fuel economy losses (due to driving with shutters open). In another example, the engine cooling system may operate in mode 2 in response to condensate forming weather conditions greater than a threshold. For example, if rain is predicted or inferred from sensors or a GPS system, the grille shutters may be closed to reduce increased condensate formation (and decreasing of CAC outlet temperature). Fan operation may be maintained to increase or decrease engine cooling as necessary.

The engine cooling system may be further operated in a third mode (Mode 3). During operation in the third mode, electric fan operation and grille shutter opening may both be adjusted. In a first example, operation in mode 3 may be initiated in response to temperature at the CAC outlet remaining below the first threshold temperature for a duration (such as duration $\Delta t1$ as referenced in FIGS. 5 and 7) during a driver pedal tip-out. In this example, the fan may be turned off initially to increase CAC outlet temperature while the grille shutters remain open. However, if turning off the fan is not enough to increase CAC outlet temperature, after duration $\Delta t1$, opening of the grille shutters may be decreased (or closed) to further increase CAC outlet temperature. In a second example, operation in mode 3 may be triggered in response to temperature at the CAC outlet less than the first threshold temperature while the vehicle is being driven. In this example, the grille shutters may be closed and the fan may be turned off (or turned on at low rotation speed if already off) to increase CAC outlet temperature. In a third example, the engine cooling system may operate in mode 3 when the temperature at the CAC outlet remains above the second threshold temperature for a duration (such as duration $\Delta t2$ or $\Delta t3$ as referenced in FIGS. 5 and 7). If vehicle speed is less than a threshold speed, a controller may initially increase grille shutter opening to decrease CAC outlet temperature. The fan may then be turned on to further increase cooling if CAC outlet temperature remains below the second threshold temperature for duration $\Delta t2$. Alternatively, if the vehicle speed is greater than the threshold speed, fan rotation may be initially increased (or turned on) while the grille shutters remain closed. If, after duration $\Delta t3$, CAC outlet temperature remains above the second threshold temperature, the grille shutters may be opened to increase cooling. In a fourth example, the engine cooling system may operate in mode 3 when the engine coolant temperature is greater than a second threshold value. In this example, the electric fan may be turned on and the grille shutters may be opened to increase engine cooling. In a fifth example, the engine cooling system may operate in mode 3 during a non-driven vehicle condition, while all other parameters (e.g., CAC outlet temperature, engine coolant temperature, etc.) are within their threshold values. For example, if all parameters are within threshold values during a non-driven vehicle condition, the controller may open the grille shutters and turn on the fan.

In this way, electric fan operations may be controlled in response to engine temperatures, vehicle driving conditions, CAC outlet temperature, and outside weather conditions. By adjusting electric fan operations in coordination with grille shutter operations, CAC outlet temperature may be better controlled while improving engine cooling, fuel economy, and energy savings. By selectively increasing an electric fan speed, engine system components may be cooled. Grille shutters may also be separately or concurrently opened to assist in cooling by further increasing ambient air flow. During other conditions, grille shutters may be closed, limiting an amount of cooling air flow directed towards a CAC, decreasing temperature at the CAC outlet. In addition, electric fan operation may be adjusted to change the temperature at the CAC outlet and control condensate formation. Controlling an electric fan and grille shutters in this way allows for adequate engine cooling, while optimizing vehicle fuel economy and energy savings, reducing engine misfire, and reducing CAC corrosion.

As will be appreciated by one of ordinary skill in the art, routines described herein may represent one or more of any number of electric fan or grille shutter adjustment controls. As such, various steps or functions illustrated may be performed in the sequence illustrated, in parallel, or in some cases omitted. Likewise, the order of control is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for controlling an engine-driven vehicle fan, comprising:
   with an engine controller,
      boosting intake air delivered to an engine of a vehicle via controlling operation of a turbocharger;
      routing low-pressure EGR from downstream of a turbine of the turbocharger to upstream of a compressor of the engine;
      adjusting fan operation of a fan cooling engine coolant in response to a temperature at an outlet of a charge air cooler (CAC), the outlet of the CAC positioned upstream of combustion chambers of the engine of the vehicle; and
      adjusting a grille shutter in response to the temperature at the outlet of the CAC.

2. The method of claim 1, wherein the fan is an electric fan that is adjusted to increase the temperature at the outlet of the CAC during a first set of conditions, and to decrease the temperature at the outlet of the CAC during a second, different, set of conditions.

3. The method of claim 2, wherein the first set of conditions includes when the temperature at the CAC is less than a first threshold temperature.

4. The method of claim 3, wherein the first threshold temperature is based on a threshold rate of condensate formation.

5. The method of claim 3, wherein the first threshold temperature is further based on one or more of ambient temperature, ambient humidity, vehicle speed, engine load, dew point temperature at the outlet of the CAC, CAC pressure to ambient pressure ratio, and boost pressure.

6. The method of claim 2, wherein the second set of conditions includes when the temperature at the CAC is greater than a second threshold temperature.

7. The method of claim 2, wherein increasing the temperature at the outlet of the CAC includes one of decreasing fan speed, turning the fan off, and reversing fan rotation direction.

8. The method of claim 7, wherein increasing the temperature at the outlet of the CAC further includes, if the fan is off, turning the fan on at a low rotation speed.

9. The method of claim 2, wherein decreasing the temperature at the outlet of the CAC includes one of turning the fan on and increasing fan speed.

10. The method of claim 1, wherein the fan is at least one of an electric fan and a dedicated charge air cooler fan.

11. The method of claim 1, further comprising adjusting fan speed responsive to vehicle speed.

12. A method for controlling an electric fan and grille shutters of an engine-driven vehicle, comprising:
with an engine controller,
boosting intake air to an engine and flowing low-pressure EGR via controlling operation of a turbocharger; and
in response to a temperature at an outlet of a charge air cooler (CAC), where the outlet of the CAC is upstream of combustion chambers of the engine, adjusting only electric fan operation during a first mode, adjusting only grille shutter opening during a second mode, and adjusting both the electric fan operation and grille shutter opening during a third mode.

13. The method of claim 12, wherein the electric fan and grille shutters are adjusted to increase the temperature at the outlet of the CAC when the temperature is lower than a first threshold, and to decrease the temperature at the outlet of the CAC when the temperature is higher than a second, different threshold.

14. The method of claim 13, wherein increasing the temperature at the outlet of the CAC includes one or more of decreasing fan speed, reversing fan rotation direction, and decreasing an opening of the grille shutters.

15. The method of claim 14, wherein increasing the temperature at the outlet of the CAC further includes, if the fan is off, turning the fan on at a low rotation speed and decreasing an opening of the grille shutters.

16. The method of claim 13, wherein decreasing the temperature at the outlet of the CAC includes one or more of turning the fan on, increasing fan speed, and increasing an opening of the grille shutters.

17. The method of claim 13, further comprising adjusting the electric fan and grille shutters in response to engine cooling parameters, driver pedal tip-out, and condensate-forming weather conditions.

18. The method of claim 17, wherein the first mode includes when the temperature at the outlet of the CAC is greater than the second threshold temperature while the vehicle is being driven at a speed higher than a threshold speed, when the temperature at the outlet of the CAC is less than the first threshold temperature during a driver pedal tip-out, and when an engine coolant temperature is greater than a first threshold value.

19. The method of claim 17, wherein the second mode includes when the temperature at the outlet of the CAC is greater than the second threshold temperature while the vehicle is being driven at a speed lower than a threshold speed and when condensate-forming weather conditions are greater than a threshold.

20. The method of claim 17, wherein the third mode includes when the temperature at the outlet of the CAC remains below the first threshold temperature for a duration during a driver pedal tip-out, when the temperature at the outlet of the CAC is less than the first threshold temperature while the vehicle is being driven, when the temperature at the outlet of the CAC remains above the second threshold temperature for a duration, and when an engine coolant temperature is greater than a second threshold value.

* * * * *